United States Patent Office 3,658,758
Patented Apr. 25, 1972

3,658,758
FLUORINATED NOVOLAK
Stuart B. Eglin, Atlanta, Edgar W. Eisenbraun, Dunwoody, Ga., assignors to Lockheed Aircraft Corporation, Burbank, Calif.
No Drawing. Filed July 22, 1970, Ser. No. 57,839
Int. Cl. C08g 5/16
U.S. Cl. 260—53 HA          5 Claims

ABSTRACT OF THE DISCLOSURE

Unique and highly desirable properties are exhibited by a phenol-formaldehyde fluorinated novolak when the product contains a trifluoromethyl group in a position meta to the hydroxyl group in each phenyl ring in the novolak. Among the desirable properties are flame retardance, improved weatherability, resistance to hydrolysis by acids or alkalis, and resistance to thermal degradation. The novolak is prepared in an acid catalyzed reaction by condensing formaldehyde or a formaldehyde-yielding material with a phenolic compound containing a trifluoromethyl group in a position meta to the hydroxyl group on the phenyl ring. The cured novolak is useful as an impregnating resin for paper and wood to increase its moisture resistance and wet strength.

---

This invention relates to a condensation product of formaldehyde and a phenolic derivative and to the process for preparing that product. More particularly the present invention concerns the condensation products prepared, under acid catalyzed reaction conditions, from formaldehyde and a phenolic compound containing a trifluoromethyl group in a position meta to the hydroxyl group on the phenyl ring.

Resinous phenol-aldehyde condensation products have been known for many years. These phenolic resins usually employ phenol and formaldehyde as starting materials and consists principally of two types: thermosetting and thermoplastic resins. If the resins are prepared using a slight excess of formaldehyde in the presence of an acidic catalyst, phenol-ended chain polymer is obtained. Such resins are often referred to as novolaks and are thermoplastic in nature.

In order to prepare a novolak type condensation product, the phenolic reactant must demonstrate stability in an aqueous acid solution so that an acid-catalyzed reaction with formaldehyde may be effected. Upon reviewing the literature, it is found that ortho (trifluoromethyl) phenol and para (trifluoromethyl) phenol are unstable in acid solutions and are, therefore, unsuitable for use as a reactant in the present process. This would suggest that meta-trifluoromethylphenol would also be unstable in acid solutions and unsuitable for use as a reactant. It is also found that formaldehyde reacts with a phenolic compound at the two positions adjacent, or ortho, and at the one position opposite, or para, to the hydroxyl group of the phenolic compound. With the meta isomer of trifluoromethyl phenol, all three positions are available; in the ortho and para isomers only two positions are available, as indicated:

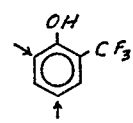

Ortho (trifluoromethyl) phenol

Two positions available ortho and para

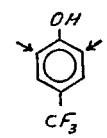

Para (trifluoromethyl) phenol

Two positions available ortho

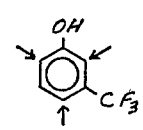

Meta (trifluoromethyl) phenol

Three positions available ortho and para

It is also generally believed that the trifluoromethyl group has a marked electron withdrawing influence on the phenyl ring. Consequently it was feared initially that the presence of the trifluoromethyl group might deactivate the phenolic compound and prevent any trifluoromethyl phenol from undergoing chemical condensations with formaldehyde. Several preliminary experiments were performed in an attempt to condense meta (trifluoromethyl) phenol with formaldehyde under normal reaction conditions for phenol-formaldehyde condensations. These attempts were generally unsuccessful. Subsequently, reactions were run at higher temperatures and a desired condensation product was obtained.

It is, therefore, an object of the present invention to provide a novel novolak type condensation product, which is prepared by the reaction of formaldehyde and a phenolic compound having a trifluoromethyl group in a position meta to the hydroxyl group on the phenyl ring. This object as well as others will become apparent from a review of the following detailed description of embodiments of the invention.

According to the present invention a novel phenolic-formaldehyde fluorinated novolak is obtained by reacting formaldehyde or a formaldehyde-yielding material with a phenolic compound containing a trifluoromethyl group in a position meta to the hydroxyl group on the phenyl ring. A generalized equation with associated formulas is shown below:

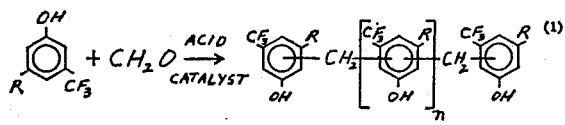

wherein each R is hydrogen, hydroxyl, or trifluoromethyl independent of the other R's in the formula, and $n$ is 0 to 22 inclusive. The penetrating bond linkage is intended to include bonding at any position ortho and para to the hydroxyl group.

A specific equation for the present invention is as follows:

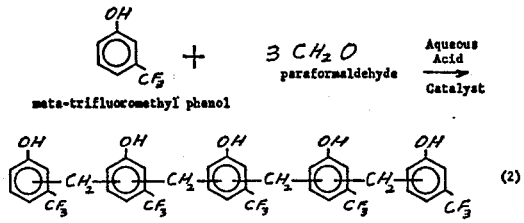

Phenol-formaldehyde fluorinated novolak

The number of repeating polymer units is shown as five, the products may contain usually from three to fourteen repeating units. This fluorinated novolak condensation product is fusible and soluble.

Suitable phenolic compound reactants include meta-hydroxybenzotrifluororide, also known as meta-trifluoromethylphenol:

a dihydroxytrifluoromethylbenzene such as 3,5-dihydroxybenzotrifluoride, also known as 3,5-dihydroxytrifluoromethylbenzene:

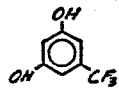

and a ditrifluoromethylphenol such as 3,5-di(trifluoromethyl)phenol:

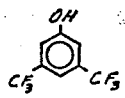

It should be understood that when using meta-trifluoromethylphenol as a reactant in commercial grade quantities, there will be a certain amount of the ortho and para isomers present. These isomers should present no difficulties and should not contaminate the reaction product because they are generally unstable under the reaction conditions.

The meta-trifluoromethylphenol reactant is prepared by nitrating benzotrifluoride (trifluoromethylbenzene) directly with nitric acid to give 3-nitrobenzotrifluoride (m-nitrobenzotrifluoride) which is in turn reduced to 3-amino benzotrifluoride (3-aminotrifluoromethylbenzene) by ammonium sulfide in alcohol solution. The 3-amino benzotrifluoride is then diazotized with sodium nitrite and hydrochloric acid. The resulting diazonium compound is then hydrolyzed in aqueous copper sulfate to yield the desired metatrifluoromethylphenol.

3,5-dihydroxybenzotrifluoride is prepared by the following route:

(a) Benzotrifluoride is nitrated with concentrated nitric acid to 3-nitrobenzotrifluoride and the resulting product is further nitrated to 3,5-dinitrozenzotrifluoride in a mixture of fuming nitric and fuming sulfuric acid (30% oleum).

(b) 3,5-dinitrobenzotrifluoride is reduced to 3-amino-5-nitrobenzotrifluoride with ammonium sulfide in alcohol solution. The resulting product is diazotized in sodium nitrite and dilute sulfuric acid and the resulting diazonium compound hydrolyzed with aqueous copper sulfate to yield 3-hydroxy-5-nitrobenzotrifluoride.

(c) The above product is reduced to 3-hydroxy-5-amino benzotrifluoride with sodium sulfide in alcohol solution. The amino compound is then diazotized as before and the resulting diazonium compound hydrolyzed in aqueous copper sulfate to yield the final product, 3,5-dihydroxybenzotrifluoride. Additional information concerning this material and methods for its preparation may be obtained from the following references:

(1) Walley, W. B., J. Chem. Soc. (London), 3016, 1949.

(2) Finger and Reed, J. Am. Chem. Soc., 66 1972, 1944.

3,5-di (trifluoromethyl) phenol is prepared by the following route:

(a) m-trifluoromethylbenzotrifluoride is nitrated directly with a mixture of concentrated nitric and sulfuric acids to yield 3,5-bis-(trifluoromethyl) nitrobenzene.

(b) That product is then reduced with ammonium sulfide in an alcohol solution to yield 3-amino-5-trifluoromethylbenzotrifluoride.

(c) That product is then diazotized with aqueous sodium nitrite and hydrochloric acid and the resulting diazonium compound is hydrolyzed to yield the final product 3,5-di (trifluoromethyl) phenol.

In the reaction which yields the present novolak condensation product, the following conditions have been found to be suitable:

OPEN SYSTEM

Temperature, ° C.—90°–100°
Presure—atmospheric
Reaction time—several days–10 min.

CLOSED SYSTEM (High pressure reactor with a two liter capacity)

Temperature, ° C.—90°–120°
Presure—autogenous
Reaction time—360 mins.–5 mins.

In an open system the preferred reaction temperature is approximately 95° C., and in a closed system the preferred reaction temperature is between about 90° C. and 120° C. By use of the word "autogenous" we mean that pressure produced by the reaction in a closed system without external influence. Customarily this pressure is significantly above atmospheric pressure.

A ratio of reactants for phenolic compound to formaldehyde or formaldehyde-yielding material of approximately 0.8 to 2.0 moles of formaldehyde per mole of phenolic compound yields suitable results. An excess amount of formaldehyde can be used without causing gelling in the pot or otherwise harming the reaction. Preferably the reactant ratio is 1.0 to 1.5 moles of formaldehyde to one mole of phenolic compound. These reaction ratios are also applicable when employing a blend of reactants such as a blend of meta-trifluoromethylphenol with either or both of 3,5-di (trifluoromethyl) benzene and 3,5-dihydroxybenzotrifluoride.

It has been found that catalysis of the reaction which yields the novolak condensation product of the present invention is advantageous and preferred. In order to produce a novolak, organic and inorganic acidic catalysts should be employed rather than basic catalysts. Suitable catalysts include hydrochloric acid, sulfuric acid, phosphoricacid, benzenesulfonic acid, xylenesulfonic acid, and toluenesulfonic acid. Preferably an 80% solution of sulfuric acid is employed in the preparation of the present novolak products since this catalyst markedly increases the rate of reaction.

Catalyst concentration in the present reaction ranging from 0.001 to 3 moles per mole of phenol have been found to be effective. A preferred catalyst concentration is about 2.0 to about 2.5 moles of catalyst per mole of phenol. The relationship of catalyst concentration to reaction time is apparently not simple, but in acid catalyzed phenol/formaldehyde condensations, such as the present reaction, catalyst concentration affects reaction rate because of its effect on pH, and pH begins to affect reaction rates strongly near neutrality. In the present catalyst ranges, the reaction rate does increase where catalyst concentration is increased, but not linearly, and not sharply.

After obtaining the novolak condensation product of the present invention it may be configured into various shapes and cured with a resole, formaldehyde, or a source of formaldehyde to produce a cross-linked composition of tough and hard characteristics. The novolak may also be used as a precursor for the production of epoxy-novolak resins.

The novolak condensation product of this invention also exhibits one particularly unique property; thin films of the resin do not support combustion. Such a test is a very rigorous indicator of flammability, since most polymers will burn as thin films.

An an additional point, it has been found that a novolak copolymer, with increased fluorine content, may be prepared by reacting meta-trifluoromethylphenol and 3,4-di (trifluoromethyl) phenol in a part by weight ratio of 3:11 with formaldehyde as previously disclosed.

A more complete understanding of the present invention will be obtained from a review of the following illustrative examples:

EXAMPLE I

To a well stirred solution of 42.9 grams (1.35 moles) of paraformaldehyde in 200 grams of 80% sulfuric acid contained in a glass beaker, 114 gram (0.72 mole) of meta-trifluoromethylphenol are added. The temperature of the reaction mixture increases from 56° C. to 108° C. in 3 minutes and external cooling is necessary to reduce the temperature to a more desirable 90° C. A novolak condensation product precipitates as a syrup and is removed from the beaker and washed with hot water and a caustic solution to remove sulfuric acid. After drying under a vacuum at 106° C., the product forms a glassy, acetone soluble, solid. The yield is 120 grams.

EXAMPLE II

The reaction of Example I is repeated except that 10.0 grams of benzenehexacarboxylic acid (mellitic acid) is used as a catalyst with 64 grams of water. The reaction is run for 23 hours at a temperature of 100° C. with heat supplied by a steam jacket. The yield is 11.5 grams of a thick oil condensate.

EXAMPLE III

The reaction of Example I is repeated except that 45.6 grams (0.28 mole) of meta-trifluoromethylphenol is reacted with 7.6 grams (0.25 mole) of symmetrical-trioxane in the presence of 0.4 gram of p-toluenesulfonic acid and 0.2 gram of oxalic acid. The reaction is run for 5 hours and 20 minutes at a temperature of 95–100° C. Condensation of the resin is completed by heating to a temperature of 140–145° C. at 40 mm. of mercury pressure to remove volatiles. The yield is 44.0 grams of hard yellow-green resin.

EXAMPLE IV

The reaction of Example I is repeated except that 30.4 grams (0.19 mole) of meta-trifluoromethylphenol and 4.5 grams (0.15 mole) of symmetrical-trioxane are combined in the presence of 15 drops of 37% hydrochloric acid solution. The reaction is run for 4 hours and 50 minutes at a temperature of 100–110° C. Condensation of the resin is completed by heating to a temperature of 140–145° C. at 40 mm. of mercury pressure to remove volatiles. The yield is 24.0 grams of a hard, brittle, clear yellow resin.

EXAMPLE V

To a 200 ml. flask is added 14.3 grams (0.45 mole) of paraformaldehyde and 100 grams of an 80% sulfuric acid solution. The acid and aldehyde are mixed and 38.0 grams (0.235 mole) of metatrifluoromethylphenol is added to the mixture, which is then stirred for 10 minutes. The flask is then placed in a steam jacket for 10 minutes. After decanting the aqueous layer, the solid product is dissolved in acetone. The acetone solution is distilled off and the remaining solid is heated in air to 100° C. A clear, light, honey-coloured resin weighing 54 grams is obtained.

EXAMPLE VI

To a 1 liter Morton flask is added 81.2 grams (0.5 mole) of meta-trifluoromethylphenol in 71 ml. of chloroform and 200 grams of an 80% sulfuric acid solution. The mixture is heated to 70° C. and 12.3 grams of paraformaldehyde are added together with 78 grams of an 80% solution of sulfuric acid. The mixture is stirred and 3.4 grams of paraformaldehyde and 72 grams of an 80% sulfuric acid solution are added. The reaction is run for five hours and a yield of 72.2 grams of clear solid resin is obtained.

EXAMPLE VII

To a 100 ml. flask 46.0 grams (0.2 mole) of 3,5-di-(trifluoromethyl) phenol, 4.8 grams (1.6 moles) of symmetrical-trioxane, 0.2 gram of p-toluenesulfonic acid, and 0.1 gram of oxalic acid are added. The reaction is run at a temperature varying between 92° C. and 140° C. for 28 hours. An oily resin weighing 8.6 grams is obtained.

EXAMPLE VIII

The reaction of Example VII is repeated except that 23.0 grams (0.1 mole) of the phenol and 2.25 grams (0.75 mole) of the trioxane are charged to the flask and 10 drops of a 37% hydrochloric acid solution are charged instead of the p-toluenesulfonic acid and the oxalic acid. An oily resin weighing 3.0 grams is obtained.

EXAMPLE IX

A solution of 973 grams (6 moles) of meta-trifluoromethylphenol in 240 grams of chloroform is gradually added to a mixture of 228 grams (7.5 moles) of paraformaldehyde and 1075 grams of 81% sulfuric acid in a 4 liter beaker at 52° C. The mixture is stirred rapidly throughout the reaction. The reaction is strongly exothermic, causing the temperature to increase to 84° C. during the addition period (72 minutes). After the addition is completed, the mixture is stirred and heated to 67–77° C. for 12 minutes, then cooled to room temperature and finally to −10° C. The product separated as a solid on top of a liquid layer. The solid was dissolved in 300 ml. of chloroform, washed with water until free of acid, and filtered. After removal of the chloroform under vacuum, a taffy-colored transparent solid weighing 1030 grams was obtained. Analysis of the solid by gel permeation chromatography showed high molecular weight fractions of 160 angstroms with average molecular weight fractions of 90–35 angstroms, corresponding to 24 and 12–5 aromatic rings, respectively, in a straight chain separated by methylene bridges.

EXAMPLE X

Epoxidation of the novolak of Example IX is accomplished by treatment with epichlorohydrin, wherein 114 grams of such novolak, 255 grams of epichlorohydrin, 4 grams of sodium hydroxide, and 2 ml. of distilled water are placed in a 500 ml. round bottom flask equipped with a stirrer, reflux condenser, and thermometer. The mixture is slowly heated to 80° C. while being stirred vigorously; the mixture is exothermic at this point and external cooling is necessary. The temperature of the mixture is controlled at 90–100° C. for 60 minutes while a total of 16 grams of sodium hydroxide is gradually added. The reflux condenser is removed and the mixture is slowly heated under vacuum from 50° C. to 150° C. to remove unreacted epichlorohydrin. The resulting brown solid is dissolved in tetrahydrofuran and filtered. After removal of the solvent, 165 grams of a light brown resin was obtained. This resin can be heat cured to an insoluble and infusible solid with diethylene triamine and triethylene tetramine, as is customary with other epoxy resins.

EXAMPLE XI

The reaction of Example IX is repeated using 57.5 grams (0.355 mole) of meta-trifluoromethylphenol in 21 grams of chloroform and 21.5 grams (0.68 mole) of paraformaldehyde in 200 grams of 80% sulfuric acid. The reaction time was 25 minutes. The product yield is 61.6 grams, and analysis of the product showed the following composition; carbon, 53.93%; hydrogen, 3.36% fluorine, 26.81%; chlorine, 0.91%; sulfur, 0.00 or trace.

The novolak of the present invention is useful as an impregnating resin for paper and for bonding paper. The resin serves to increase the moisture resistance and wet strength of the paper. The resin is also useful as an additive to drying oils such as linseed oil or tung oil so that those oils may be used to produce a heat, solvent, and water resistant coating. An additional use of the novolak comprises blending it with various phenol-formaldehyde resoles, wherein the resole functions as an added source of formaldehyde which cures the novolak without chemical modification.

Although this invention has been described in considerable detail with reference to certain preferred embodiments thereof, it should be understood that variations and modifications can be effected within the spirit and scope of the invention as described hereinabove and as defined in the appended claims.

What is claimed is:

1. Process for preparing a phenol-formaldehyde condensation novolak comprising reacting a phenol which contains a trifluoromethyl group in a position meta to the hydroxyl group on the phenyl ring with formaldehyde in the presence of an acidic novolak condensation catalyst and at a temperature of about 90° C. to about 120° C., a pressure of atmospheric to autogenous, and a reactant ratio of about 0.8 to 2.0 moles of formaldehyde per mole of phenol.

2. Process of claim 1 wherein the acidic novolak condensation catalyst is selected from the group consisting of hydrochloric acid, sulfuric acid, phosphoric acid, benzenesulfonic acid, xylenesulfonic acid, and toluenesulfonic acid.

3. Process of claim 1 wherein the acidic novolak condensation catalyst is sulfuric acid.

4. Process of claim 2 wherein the catalyst concentration is 0.001 to 3 moles of catalyst per mole of phenol.

5. Process of claim 2 wherein the catalyst concentration is 2.0 to 2.5 moles of catalyst per mole of phenol.

References Cited

UNITED STATES PATENTS 2,994,686   8/1961   Hauptschein _____ 260—53

OTHER REFERENCES

Chemistry of Phenolic Resins, Martin, 1956, pp. 59–63.

An Introduction to Polymer Chemistry, Moore, 1963, pp. 179–184.

Phenoplasts, Carswell, 1947, pp. 7–9.

HOWARD E. SCHAIN, Primary Examiner

U.S. Cl. X.R.

117—155 L; 161—264; 250—19 UA, 838